United States Patent [19]

Kitamura et al.

[11] Patent Number: 5,008,923
[45] Date of Patent: Apr. 16, 1991

[54] TESTABLE ECHO CANCELLING METHOD AND DEVICE

[75] Inventors: Youichi Kitamura; Michiko Tajimi, both of Yokohama, Japan

[73] Assignee: Hitachi, Ltd., Tokyo, Japan

[21] Appl. No.: 509,797

[22] Filed: Apr. 17, 1990

[30] Foreign Application Priority Data

Apr. 19, 1989 [JP] Japan .................. 1-097597

[51] Int. Cl.$^5$ .................. H04M 1/24; H04M 9/08
[52] U.S. Cl. .................. 379/3; 379/407; 370/13.1
[58] Field of Search .................. 379/3, 4, 406, 410, 379/407; 370/13, 13.1; 375/10; 371/20.1

[56] References Cited

U.S. PATENT DOCUMENTS 3,637,954  1/1972  Anderson et al. .................. 379/3
4,101,743  7/1978  Costes et al. .................. 379/3

OTHER PUBLICATIONS

D. L. Duttweiler et al., "A Single Chip VLSI Echo Canceler", The Bell System Technical Journal, vol. 59, Feb. 1980, pp. 149-160.
CCITT Recommendation G. 165, 1984, pp. 258-279.

Primary Examiner—Stafford D. Schreyer
Attorney, Agent, or Firm—Antonelli, Terry, Stout & Kraus

[57] ABSTRACT

A communications system adaptive echo canceller integrally contains a test far-end talker signal generator, an echo signal generator for generating an echo signal with a simulated echo path, a residual echo detector for detecting a residual echo based on the output of a subtracter, and a switching unit for switching an input and output signal of the echo canceller into an echo canceller test mode. Further, it provides a bypassing unit for, in a test mode, separating a call/talk connected to the echo cancellers from the echo cancellers and forming a bypass path between trunk circuits and a transmission circuit. The bypassing unit results in being able to realize a test for the echo canceller while a talk is alive.

13 Claims, 9 Drawing Sheets

ECHO CANCELER 11

FLOW OF CONTROLLER 15

WHITE NOISE GENERATOR

ECHO SIGNAL GENERATOR

TESTABLE ECHO CANCELLING METHOD AND DEVICE

BACKGROUND OF THE INVENTION

1. Field of the Invention

The present invention relates to an adaptive echo canceller technique used in communications equipment. More particularly, the invention relates to a testing method and device which are preferable to make sure of a function of an echo canceller.

2. Description of the Related Art

FIG. 10 shows arrangement of a testing system used for making sure of a function of an echo canceller contained in the conventional communications equipment. As shown, 11 is an echo canceller, 101 is a white noise generator, 102 is a level detector, 103 is a delay circuit, and 104 is an attenuator. The arrangement is defined according to the echo canceller and its relevant testing method discussed in CCITT Recommendation G. 165, (red book) pp 258-279. FIG. 2 is a block diagram showing basic arrangement of the echo canceller shown in FIG. 10. As shown in FIG. 2, 21 is a tap coefficient updating unit, 22 is a tap coefficient memory, 23 is an echo estimator, 24 is a far-end talker signal memory, 25 is a double talk detector, 26 is a subtracter, and 27 is a center clipper.

In order to make sure of a function of the normal echo canceller 11 under the foregoing arrangement, as shown in FIG. 10, the echo canceller 11 is connected at a terminal 3a to the white noise generator 101 in a manner to receive an output signal r(n) from the generator 101 and connected between terminals 3b and 3c to the delay circuit 103 and the attenuator 104 for simulating an echo path in a manner to receive an output signal s(n) from the attenuator 104. Under the connecting arrangement, the echo canceller 11 serves to send an output signal e(n) to the level detector 102 for detecting a residual echo level of an output signal e(n) from the echo canceller 11. The prior art relevant to detection of an echo canceller is discussed in JP-A-63-42528 and Dutteiler et al. "A single-chip VLSI Echo Canceller", the Bell System Technical Journal, Feb, 1980, pp 149-160.

The aforementioned prior art does not offer a simple function-testing method the echo canceller itself can realize. That is, it is necessary to connect the white noise generator 101, the level detector 102, the delay circuit 103, and the attenuator 104 to the echo canceller 11. Besides, the testing method requires disabling a call/talk alive in the echo canceller 11 for doing the test. It results in being unable to do a function test while a talk is alive.

SUMMARY OF THE INVENTION

It is therefore an object of the present invention to provide a testable echo canceller which is, by itself, capable of simply making sure of its function.

It is another object of the invention to provide a testable echo canceller and its relevant testing method which are capable of making sure of the function while a call/talk is alive and are preferable to any use of a communications system.

In order to achieve those objects, a testable echo canceller according to the invention comprises, in itself, a test far-end talker signal generating means, an echo signal generating means for simulating an echo path and generating an echo signal, an echo detecting means for detecting a residual echo level, and a control means for switching a signal path to an echo cancel mode or test mode. This arrangement results in allowing the echo canceller to makes sure of the function by itself.

With a means for enabling a call/talk signal to bypass the echo canceller in the course of the test in a communications system, it is possible to test an echo canceller while a call/talk is alive.

The function offered by each of those means can be realized by digital signal processors (DSP) composing the echo canceller and the software run on these processors. It means that simple arrangement makes it possible to realize those means.

For performing a test with the testable echo canceller, the far-end talker signal generating means serves to generate a 1-bit white noise as a far-end talker signal and the echo signal generating means serves to generate an echo signal, which is the white noise far-end talker signal delayed and attenuated to the same extent as the simulated echo path. The residual echo detecting means serves to detect a level of a residual echo signal, which means the echo signal left after each cancellation, and the signal path switching means serves to control a signal input or output to the echo canceller and send out a testing result of the echo canceller through the residual echo detecting means.

With the bypassing means, a near-end talker signal input to the echo canceller for testing the function bypasses the echo canceller when it is output. Hence, the test can be performed without having to interrupt a call/talk passing on to the echo canceller.

DESCRIPTION OF THE PREFERRED EMBODIMENTS

An embodiment of the invention will be described in detail with reference to the appended drawings.

Figure 1:
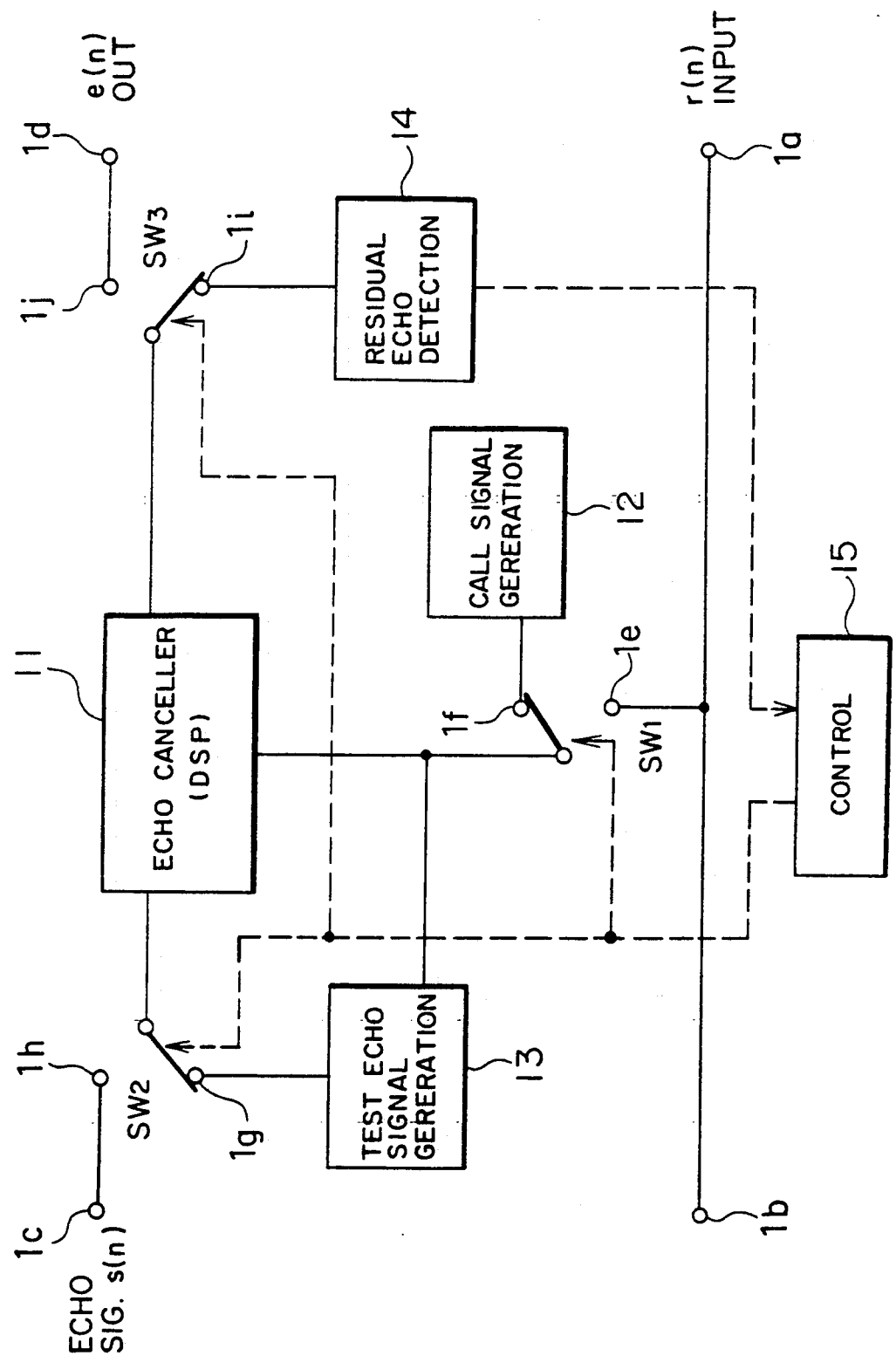
FIG. 1 is a block diagram showing one embodiment of a testable echo canceller according to an embodiment of the invention.

FIG. 1 is a block diagram showing a testable echo canceller according to an embodiment of the invention. As shown, 11 is an echo canceller, 12 is a far-end talker signal generating unit, 13 is an echo signal generating unit, 14 is a residual echo detecting unit, and 15 is a control unit for controlling a signal input or output to the echo canceller in a manner to form an echo canceller mode and a test mode for the far-end talker signal by switching a signal path in the echo canceller.

Figure 2:
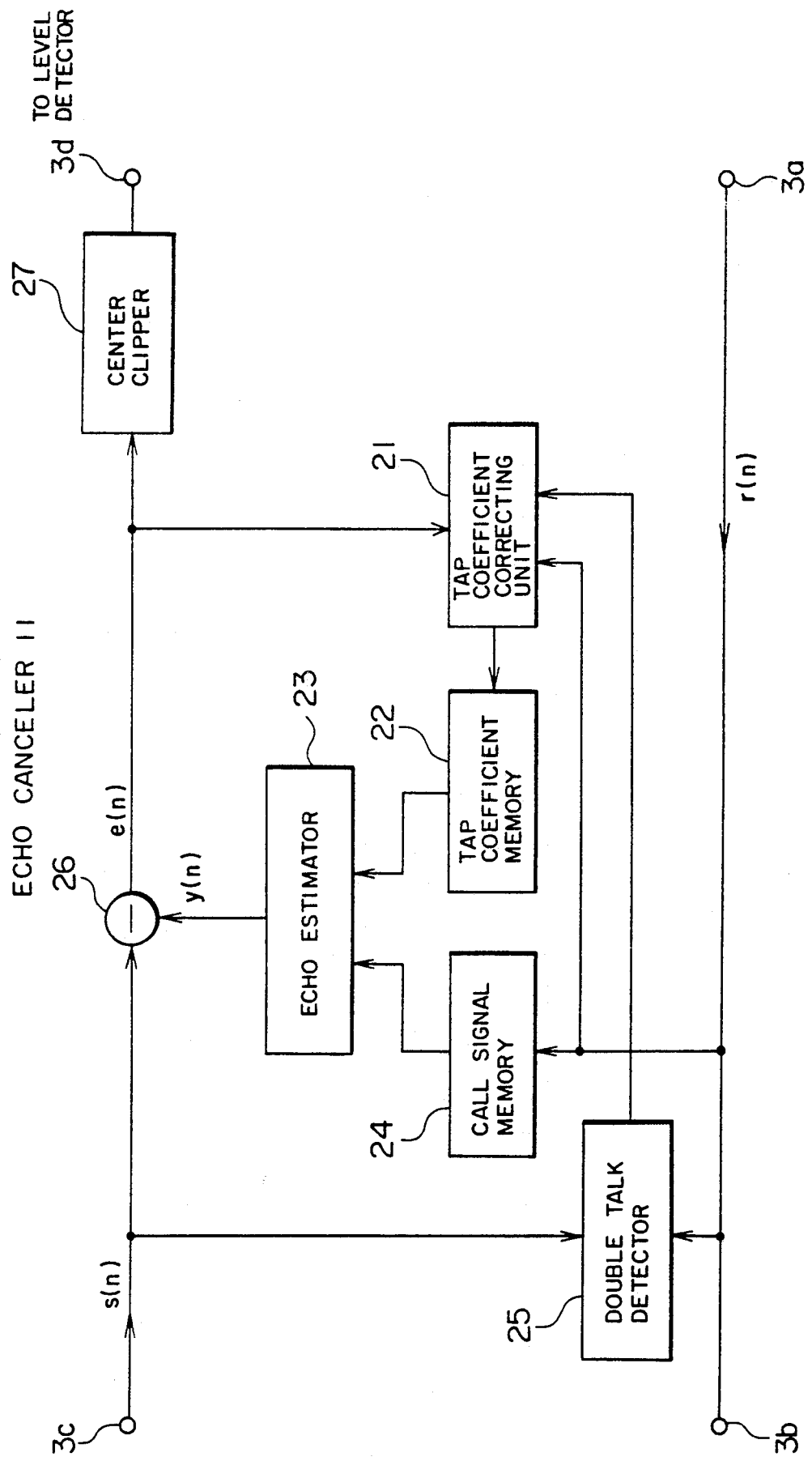
FIG. 2 is a block diagram showing a conventional echo canceller to be used for that shown in FIG. 1.

The basic arrangement of the echo canceller 11 can employ the arrangement shown in the block diagram of FIG. 2.

Figure 3:
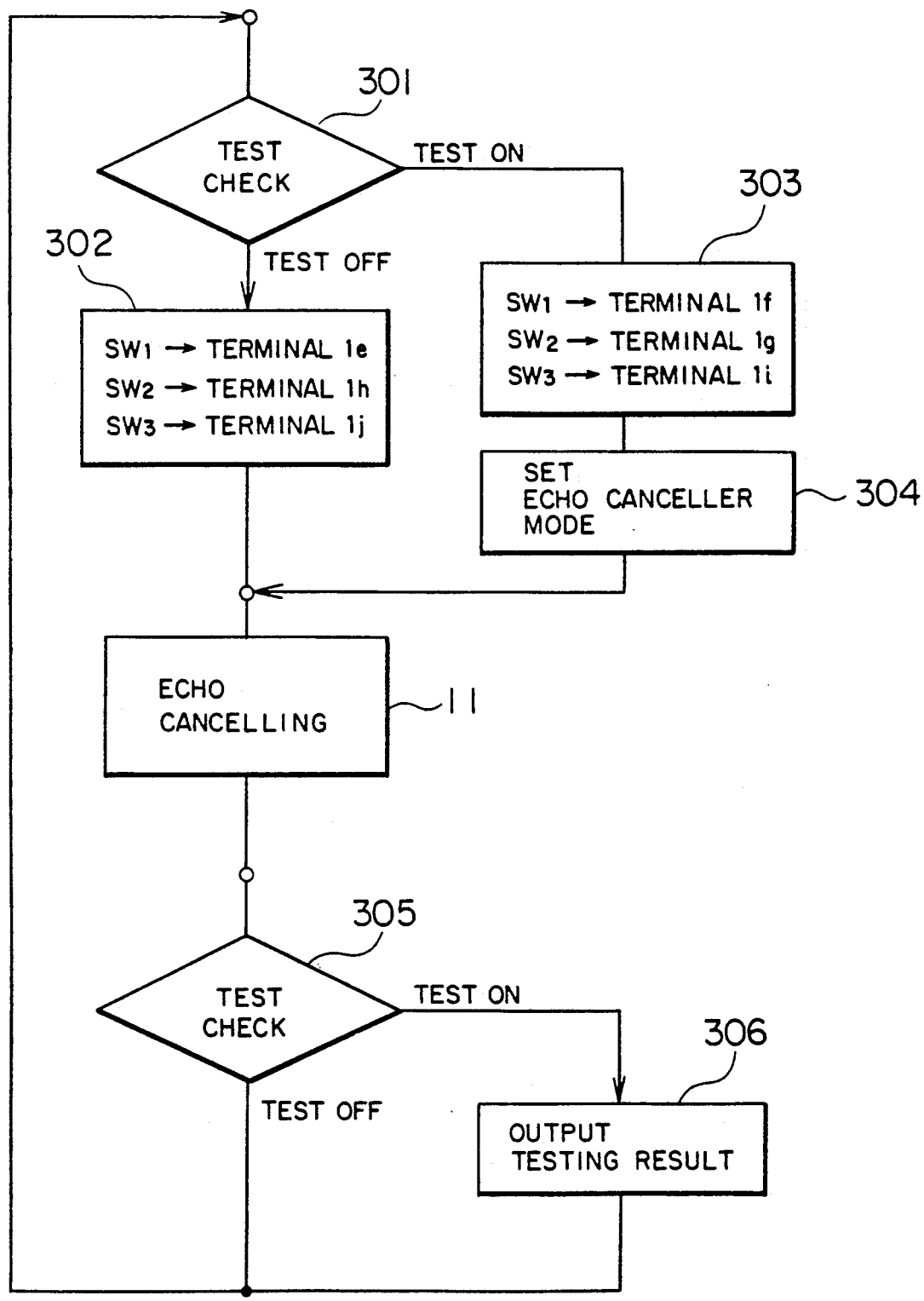
FIG. 3 is a flowchart showing the operation of a control unit shown in FIG. 1.

FIG. 3 is a flowchart showing the operation of the control unit 15 in FIG. 1. As shown, the control unit 15 serves to normally connect a switch SW1 to a terminal 1e side, a switch SW2 to a terminal 1h side, and a switch SW3 to a terminal 1j side if the test is determined to be OFF in the test ON check at a step 301. The echo canceller 11, therefore, receives a far-end talker signal r(n) at a terminal 1a and an echo signal s(n) at a terminal 1c through an echo path connected between terminals 1b and 1c and sends out a residual echo signal e(n) at a terminal 1d. When the echo canceller stays in this normal operating state, the process returns to a step 301 if the test is determined to be OFF in the test ON check.

If the test is determined to be ON in the test ON check at the step 301, the control unit 15 serves to connect the switch SW1 to a terminal if side, the switch SW2 to a terminal 1g side, and the switch SW3 to a terminal 1i side at a step 303. The echo canceller 11, therefore, receives a far-end talker signal r(n) from the far-end talker signal generating unit 12 and an echo signal s(n) from the echo signal generating unit 13. At a next step 304, the process serves to set a ready state for starting the test of the echo canceller 11. In the ready state, if the test is determined to be ON in the test ON check at a step 305, the process serves to output a testing result at a step 306 and then returns to a step 301.

Figure 4:
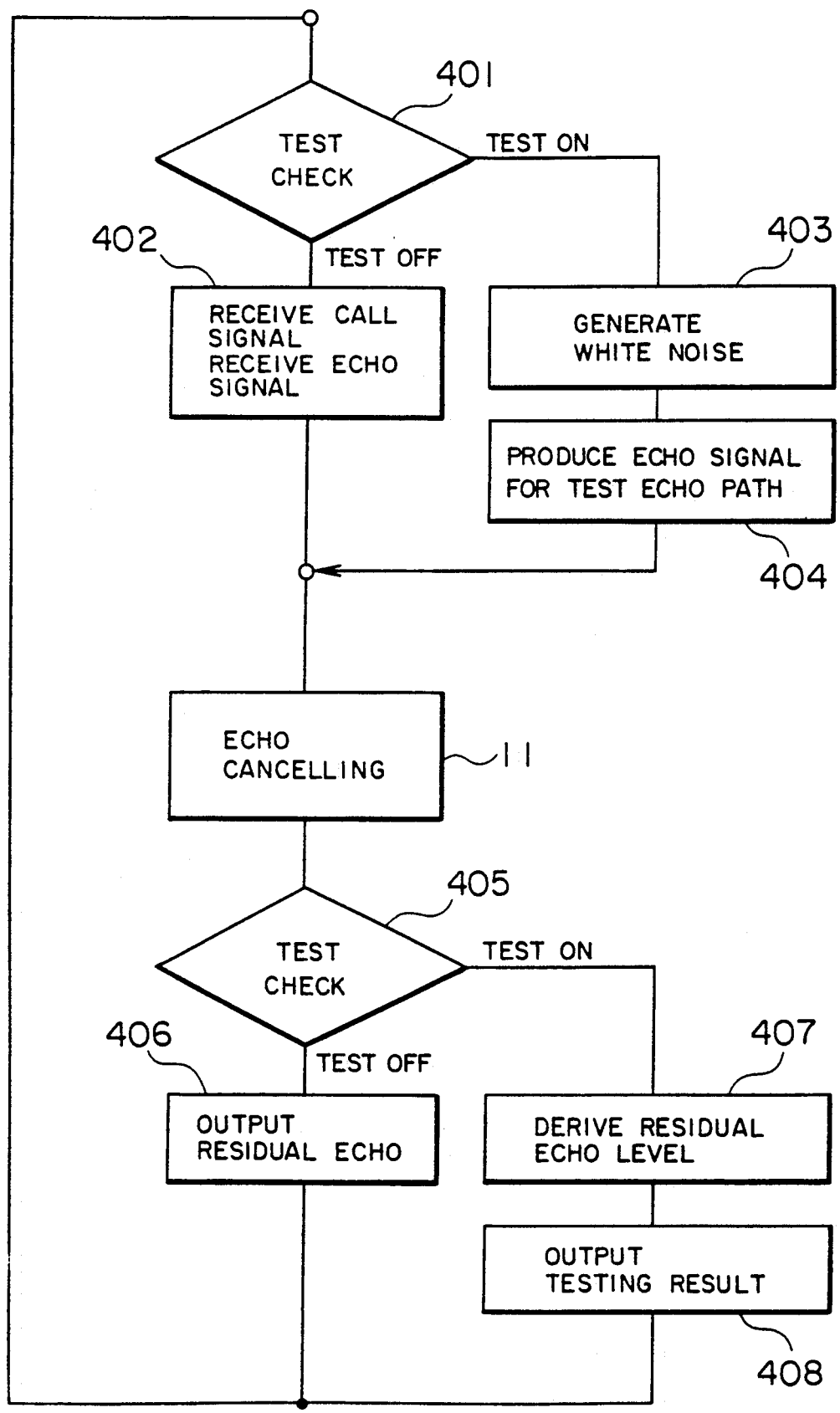
FIG. 4 is a flowchart showing the operation done in the echo canceller shown in FIGS. 1 and 2.

FIG. 4 is a flowchart showing the operation of the echo canceller shown in FIGS. 1 and 2. As shown, if the test is determined to be OFF in the test ON check at a step 401, the control unit 15 serves to normally connect the switches SW1, SW2, and SW3 to the terminals 1e, 1h, and 1j sides, respectively. At a step 402, the echo canceller receives a far-end talker signal r(n) at the terminal 1a (3a) into the far-end talker signal memory 24. The echo canceller 11 receives an echo signal s(n) at the terminal 1c (3c) through an echo path connected between the terminals 1b and 1c (3b and 3c). Based on the normal fundamental operation of the echo canceller 11, if the test is determined to be OFF in the test ON check at a step 405, the center clipper 27 serves to send out an output as a residual echo signal e(n) at the terminal 1d (3d).

Then, a description will be directed to the fundamental operation of the echo canceller 11 shown in FIG. 2. Based on the far-end talker signal r(n) stored in the far-end talker signal memory 24 and a tap coefficient $h_i$ stored in the tap coefficient memory 22, the echo estimator 23 serves to perform a filtering operation of;

$$y(n) = \sum_{k=0}^{N} r(n-k) \times h_k$$

where N denotes a number of filter steps and K denotes a tap number. It results in deriving a pseudo echo signal y(n). Based on the echo signal s(n) and the pseudo echo signal y(n), the subtracter 26 serves to perform an operation of;

$$e(n) = s(n) - y(n)$$

It results in producing a residual echo signal e(n).

The center clipper 27 serves to derive a residual echo signal level $e_{pow}$. Then, the following equation is performed.

$$e_{pow} = \sum_{k=0}^{M} e(n-k)^2 \quad (M \text{ denotes a number of samples.})$$

$$e_{pow} \leq TH1 \ e(n) = 0$$
$$e_{pow} > TH1 \ e(n) = e(n)$$

where TH1 represents a threshold level of the center clipper. If the residual echo signal e(n) is quite weak, the output signal e(n) is forcibly reduced to zero for enhancing an echo suppressing effect.

On the other hand, the tap coefficient updating unit 21 serves to sequentially update a tap coefficient $h_i$ in a manner to reduce the residual echo signal e(n) as small as possible using a learning identification algorithm. With this learning identification algorithm, the tap coefficient $h_i$ is updated according to the equation;

$$h_i(n+1) = h_i(n) + \alpha \frac{e(n)}{p(n)} \cdot r(n-i) \quad (\alpha \text{ is a coefficient})$$

$$p(n) = \sum_{k=0}^{N} r(n-k)^2$$

And, if a double talk is caused, the double talk detector 25 serves to cancel updating of a tap coefficient $h_i$ in the tap coefficient updating unit 21 for avoiding correction of the identified tap coefficient $h_i$.

Next, a description will be directed to the testing operation of making sure of the function of the echo canceller 11. In FIG. 4, the control unit 15 receives a test-starting command from the external except the echo canceller 11 involved in a communications equipment. If the test is determined to be ON in the test ON check at the step 401, it serves to connect the switches SW1, SW2, and SW3 to the terminals 1f, 1g, and 1i sides, respectively. Then, at a step 403, the far-end talker signal generating unit 12 generates a white noise for producing a far-end talker signal r(n). At a step 404, the echo signal generating unit 13 produces an echo signal s(n) for an echo path used for the test. The echo canceller 11 serves to receive the output signal of the far-end talker signal generating unit 12 as a far-end talker signal r(n) and to receive an output signal of the echo signal generating unit 13 as an echo signal s(n).

Further, for making sure of whether or not the system is stable at the testing time, the echo canceller 11 is disabled for predetermined (x) seconds after starting the test in order to stop the operation of the subtracter 36, such that the equation of;

$$e(n) = s(n)$$

is performed. After the predetermined (x) seconds are passed since the test is started, the echo canceller 11 is enabled in order to start the operation of the subtracter 38 for the test. If the test is determined to be ON in the test ON check at the step 405, the echo canceller 11 serves to send out the output signal e(n) to the residual echo detector 14 in which a power level of the residual echo signal e(n) is derived. Then, at a step 408, the control unit 15 serves to output a testing result, and the process returns to the step 401.

Figure 5:
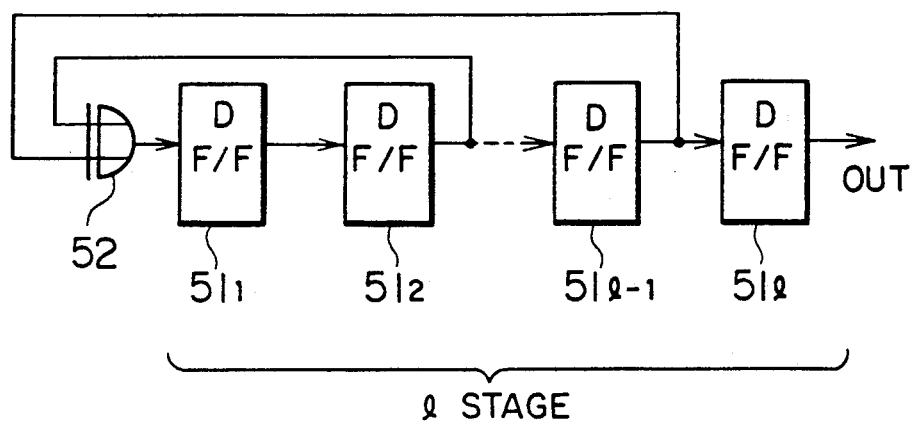
FIG. 5 is a block diagram showing one example of a far-end talker signal generating unit of the echo canceller shown in FIG. 1.

FIG. 5 is a block diagram showing the far-end talker signal generating unit 12 shown in FIG. 1. As shown in FIG. 5, $51_1, 51_2, \ldots 51_l$ each denotes a delayed flip-flop (D-F/F) and 52 denotes an exclusive OR circuit. This far-end talker signal generating unit 12 is serviceable as a white noise generator. The generator consists of a 1-bit shift register having a l-stage D-F/F $51_1$ to $51_l$ for generating a white noise. As an initial input, an exclusive OR at a proper stage of the output tap is supplied to the shift register through the exclusive OR circuit 52 and the output of each D-F/F $51_1$ to $51_l$ is drawn to producing a white noise. This white noise signal is input as a far-end talker signal r(n) to the echo canceller 11 as well as the echo signal generating unit 13. The foregoing function can be realized using a program run on the memory and the processors (DSP). And, it is well known that the function of the echo canceller itself can be realized using the DSPs. Hence, it is to be understood that such DSPs can be used for the testing circuit in the present invention. That program should be pre-loaded in ROMs of those processors.

Figure 6:
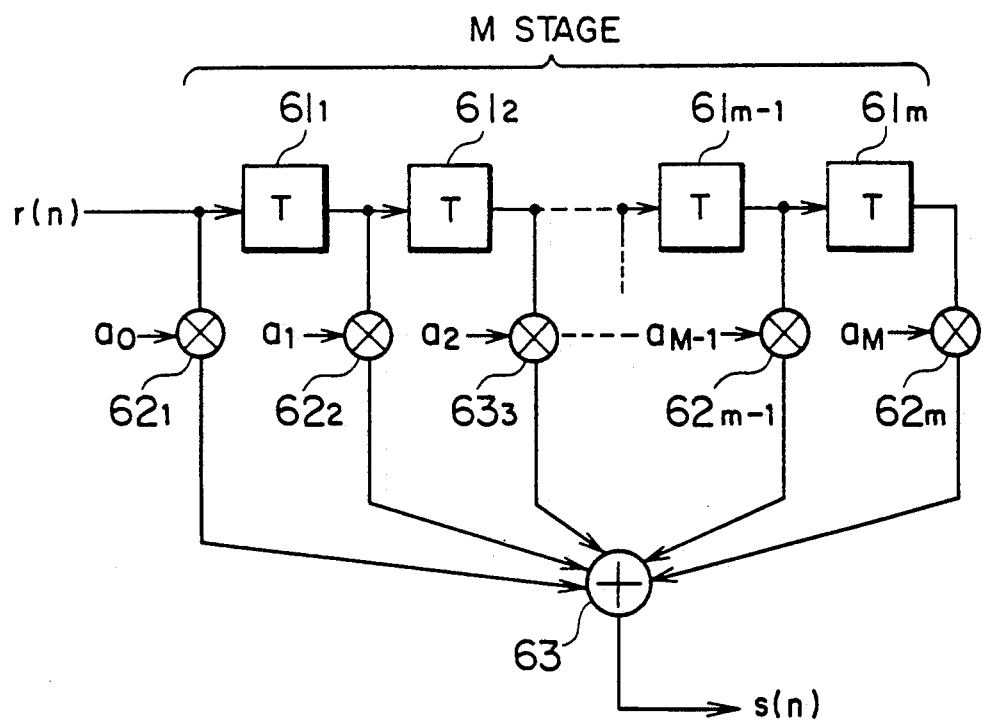
FIG. 6 is a block diagram showing one example of an echo signal generating unit of the echo canceller shown in FIG. 1.

FIG. 6 is a block diagram showing the echo signal generating unit 13 shown in FIG. 1. As shown in FIG. 6, $61_1$ to $61_m$ each denotes a delaying element, $62_1$ to $62_m$ each denotes a multiplier, and 63 denotes an adder. This echo signal generating unit 13 consists of M-stage finite impulse response (FIR) filters simulating an echo path and serves to perform the following operation for producing an echo signal s(n), which is entered into the echo canceller 11.

$$s(n) = \sum_{k=0}^{M} a_k \times r(n - k)$$

where $a_k$ denotes a filter coefficient.

The echo canceller 11 receiving the far-end talker signal r(n) and the echo signal s(n) operates to presume an echo path (the echo signal generating unit 13 at this testing time) and sends out the output signal s(n) to the residual echo detector 14. The residual echo detector 14 serves to derive a power $e_{pow}$ of the residual echo signal e(n) with the equation of;

$$e_{pow} = \sum_{k=0}^{M} e(n - k)^2$$

This power $e_{pow}$ is input to the control unit 15.

The control unit 15 receiving the power $e_{pow}$ of the residual echo signal e(n) serves to output the following testing results according to the power $e_{pow}$ given in the disabled echo canceller 11 from the test-starting point unit an x-second one.

If $e_{pow} \geq TH$, Test 1 is OK
If $e_{pow} < TH$, Test 1 is NG

Further, it also serves to output the following testing results according to the power $e_{pow}$ given in the enabled echo canceller 11 between an x-second time point and an x'-second one since the test is started.

If $e'_{pow} < TH$ and Test 1 is OK, Test is OK
If $e'_{pow} \geq TH$ or Test 1 is NG, Test is NG where TH is a constant given according to an echo-cancelling amount of the echo canceller 11 and the level of the white noise generated by the far-end talker signal generating unit 12.

As discussed above, the testing result is provided according to each residual echo given in case of the disabled or the enabled echo canceller 11. Hence, it is possible to detect a state of e=0 in which the echo canceller 11 is failed for producing no output.

The present embodiment makes it possible to test the function of the echo canceller by itself.

Figure 7:
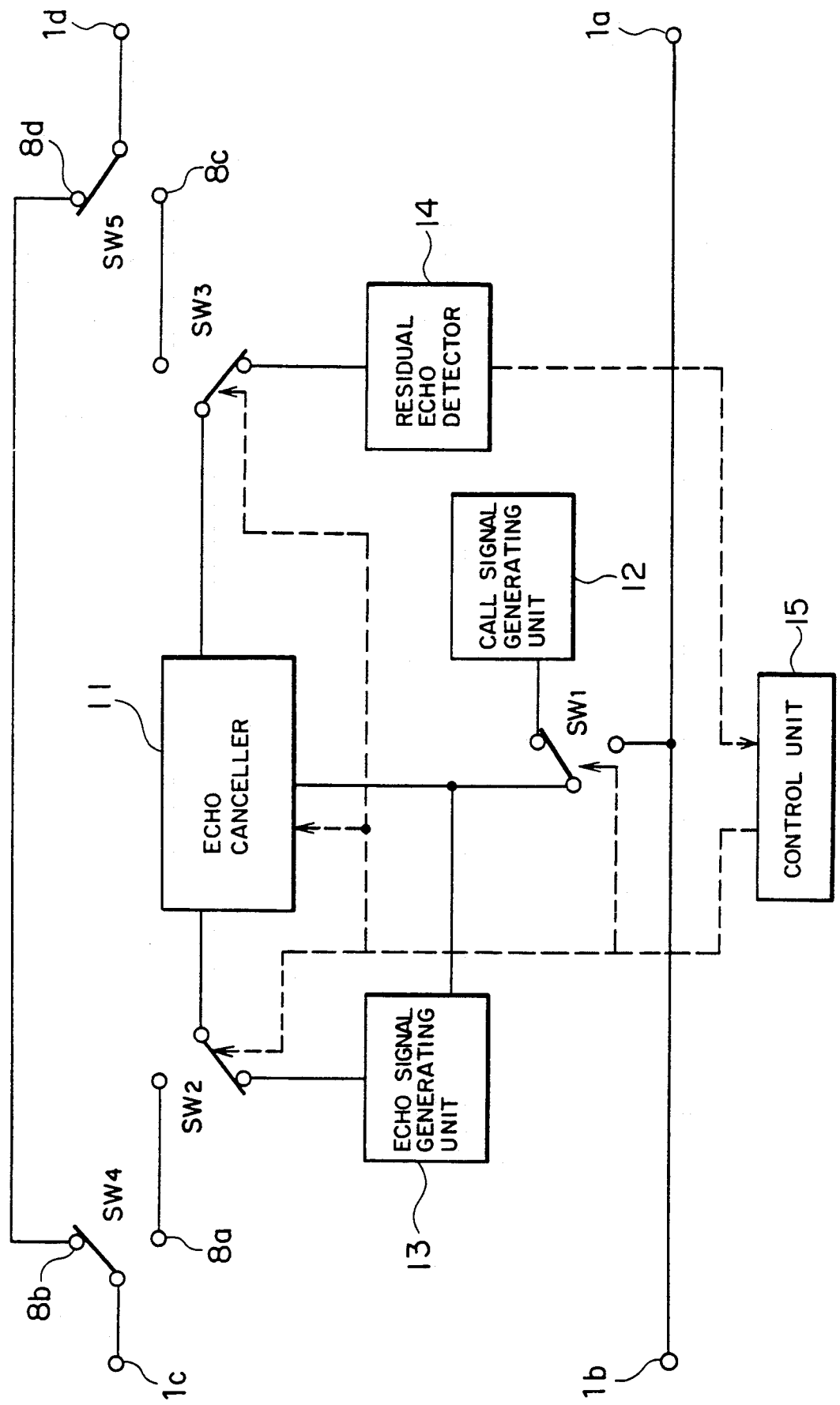
FIG. 7 is a block diagram showing a testable echo canceller according to another embodiment of the invention.

FIG. 7 is a block diagram showing a testable echo canceller according to another embodiment of the invention. As shown in FIG. 7, the same reference numbers as those shown in FIG. 1 indicate the same elements. 11 is an echo canceller shown in FIG. 2, 12 is a far-end talker signal generating unit shown in FIG. 5, 13 is an echo signal generating unit shown in FIG. 6, 14 is a residual echo detector, and 15 is a control unit, the operation of which is represented in FIG. 3. 8b and 8d represent input and output terminals, which are used for composing a bypassing circuit for a near-end talker signal along with switches SW4 and SW5, 8a and 8c represent input and output terminals used in the normal echo-cancelling operation.

Figure 8:
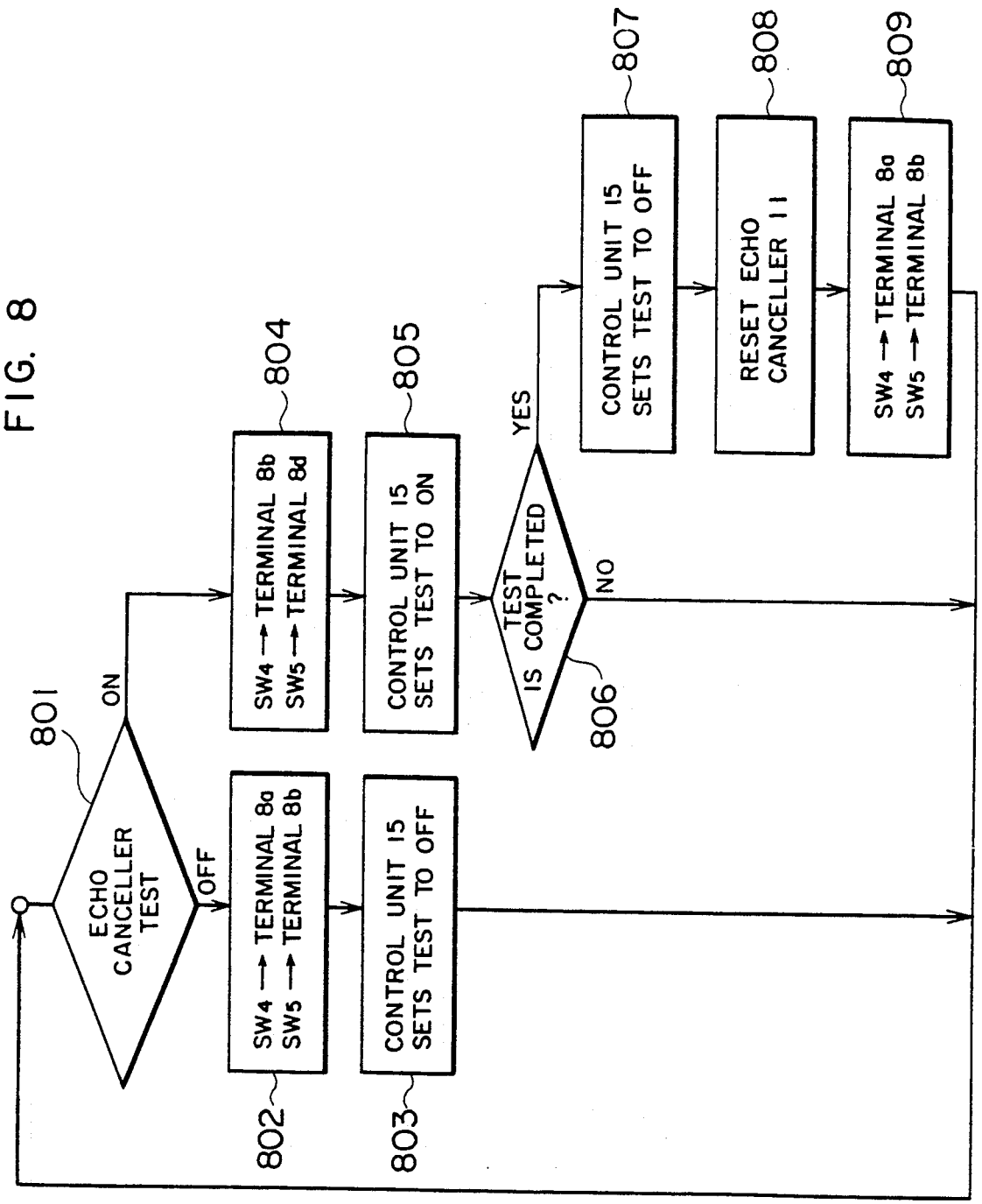
FIG. 8 is a flowchart showing the operation of the embodiment shown in FIG. 7.

FIG. 8 is a flowchart showing the operation shown in FIG. 7.

As shown in FIG. 8, in a normal state, if the test for the echo canceller 11 is determined to be OFF in the test ON check at a step 801, at a step 802, the echo canceller 11 serves to connect the switch SW4 to the terminal 8a side and the switch SW5 to the terminal 8c side. Then, at a step 803, the control unit 15 serves to set the test to OFF. In this arrangement, the echo canceller 11 receives a far-end talker signal r(n) at the terminal 1a and an echo signal s(n) at the terminal 1c. Then, it presumes an echo path connected between the terminals 1b and 1c and outputs a residual echo signal e(n) at the terminal 1d.

And, in the testing state, at a step 801, if the test is determined to be ON, the echo canceller 11 serves to connect the switch SW4 to the terminal 8b side and the switch SW5 to the terminal 8d side. Then, at a step 805, it serves to set the control unit 15 to an ON state. Hence, the echo canceller 11 operates to test the function similarly as described in FIG. 1. The echo signal s(n) to be input at the terminal 1c through the echo path bypasses the echo canceller 11, that is, directly leads to the terminal 1d. It results in being able to perform the test without having to interrupt a call/talk.

At a test-completing stage, if the test is determined to be completed in the test completion check at a step 806, the control unit 15 is released from an active testing state at a step 808 and then the echo canceller 11 is reset. Next, at a step 809, the echo canceller 11 serves to switch the switch SW4 to the terminal 8a and SW5 to terminal 8b in a manner to start presuming an echo path connected between the terminals 1b and 1c again from the initial state.

Figure 9:
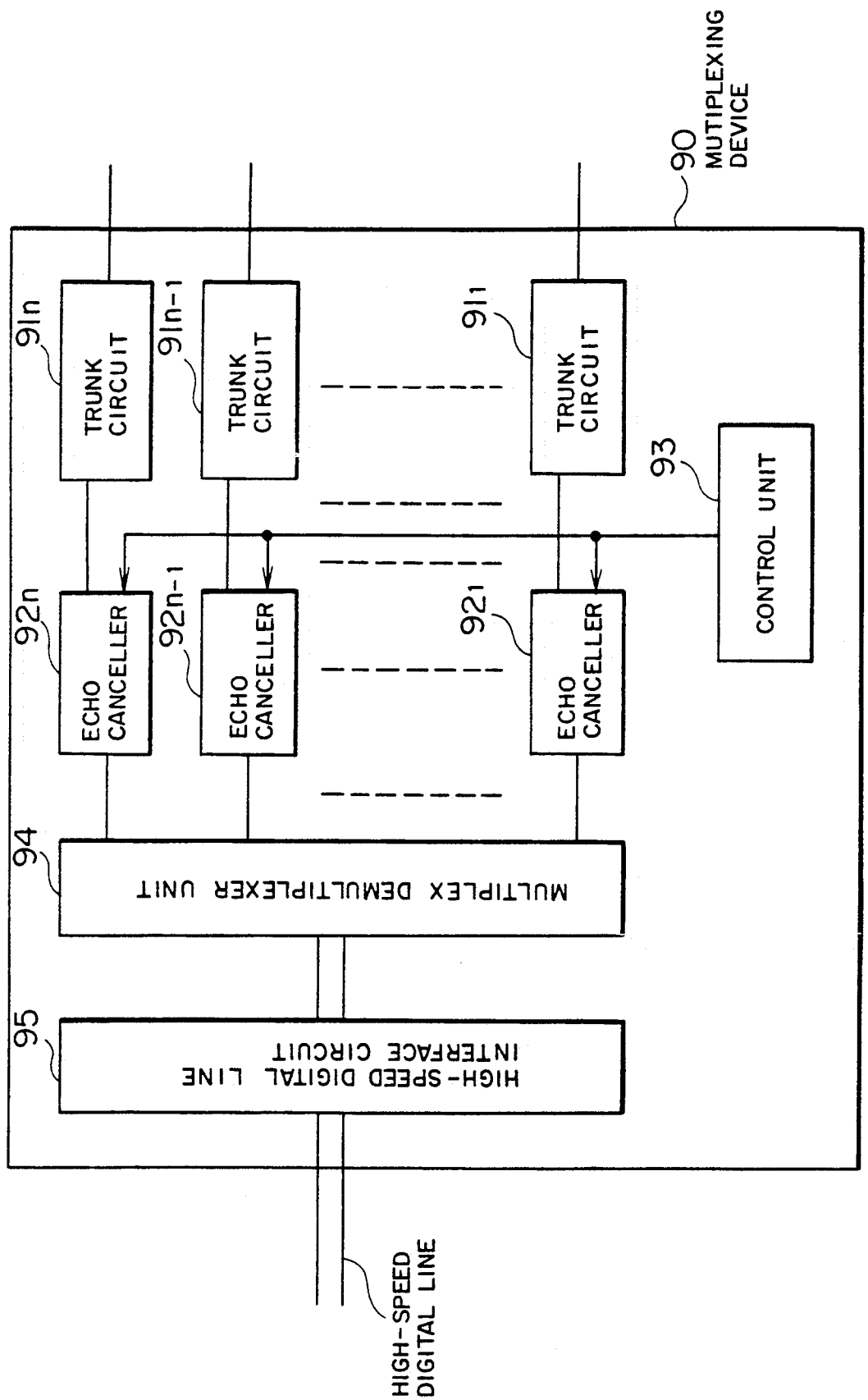
FIG. 9 is a block diagram showing an embodiment of a communications equipment to which the testable echo canceller according to the invention is applied.
Figure 10:
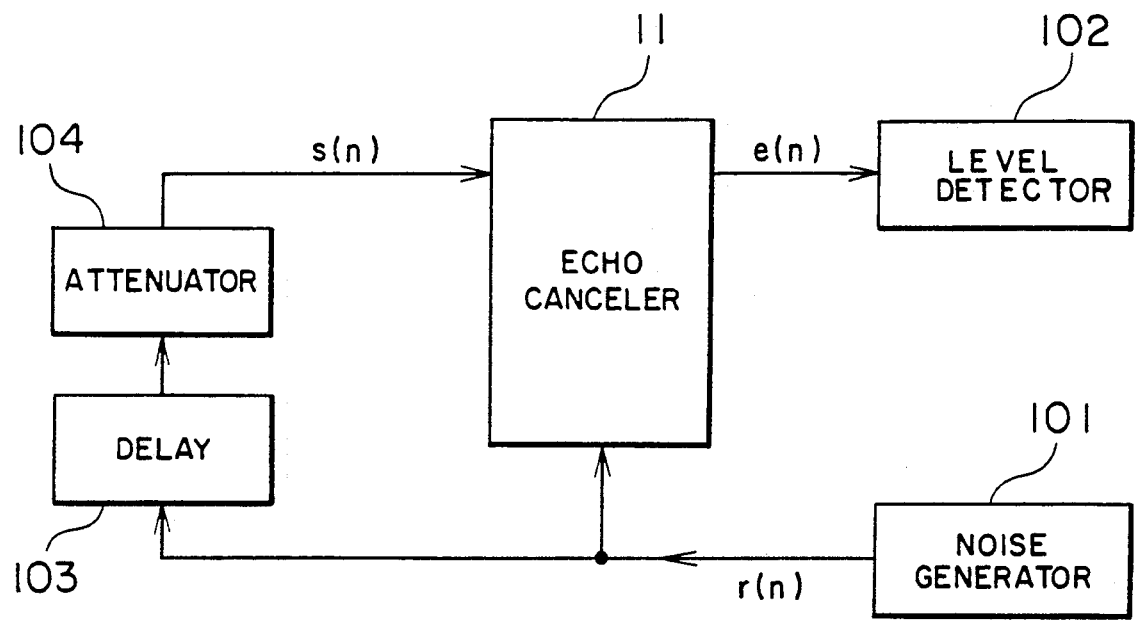
FIG. 10 is a block diagram illustrating a testing method of the conventional echo canceller.

FIG. 9 is a block diagram showing an embodiment of a communications equipment including a testable echo canceller. This embodiment described a multiplexing device to which the testable echo canceller shown in FIG. 7 is applied. As shown, 90 is a multiplexing device, $91_1$ to $92_n$ (n is a positive integer) are each trunk circuit, $92_1$ to $92_n$ are each testable echo canceller according to the invention, 93 is a control unit for the echo canceller's, 94 is a multiplexer/demultiplexer unit, and 95 is a high-speed digital line interface circuit.

When the multiplexing device performs the test for the echo canceller 11, the echo canceller control unit 93 serves to issue a test-starting command to the testable echo cancellers $92_l$ to $92_n$. In receipt of the command, each canceller performs the foregoing testing operation and sends out the testing result to the echo canceller control unit 93. With the display of the received testing result, for example, the echo canceller control unit 93 is capable of making sure of the function of the echo canceller 11. Further, for performing the test, the control unit 93 can selectively or serially use those echo cancellers in accordance with the program. In addition, the test can be accomplished in an automatic and steady manner.

As set forth above, the present invention offers an advantage that it is possible to easily make sure of the performance of the echo canceller, because the invention makes it possible to perform the test with the echo canceller itself.

Further, the invention enables the test to be performed while a talk is alive. It thus offers an advantage that it is possible to easily make sure of if the echo canceller functions normally or abnormally without having to block a communications line.

What is claimed is:

1. A testable echo canceller comprising an input and an output terminals for a far-end talker signal, an input and an output terminals for near-end talker signal a memory for storing said input far-end talker signal, a tap coefficient memory for storing a tap coefficient of an echo estimator, the echo estimating means for generating a pseudo echo signal based on the contents of said far-end talker signal memory and said tap coefficient memory, a subtracter means for subtracting said psuedo echo signal from an echo signal passed through an echo path for producing a residual echo signal, a tap coefficient updating means for serially updating said tap coefficient based on said far-end talker signal and said residual echo signal, a test far-end talker signal generating means for generating a far-end talker signal used for the test, a test echo signal generating means for generating a test echo signal with a simulated echo path, a residual echo detector having an output terminal connected to said subtracter means and for detecting a residual echo signal, and a control means for controlling formation of a path for an input and output signal passed to the echo canceller and formation of a testing circuit for making sure of the function with the echo canceller itself.

2. The testable echo canceller claimed in claim 1, wherein said control means includes a first switching means for switching in input of said far-end talker signal memory between an output of said test far-end talker signal generating means and said input far-end talker signal terminal, a second switching means for switching between an output of said test echo signal generating means and echo path, and a third switching means for switching an output of said subtracter means between the input of said residual echo detecting means and said near-end talker signal output terminal.

3. The testable echo canceller claimed in claim 2, wherein said first switching means establishes a path for supplying the output of said test far-end talker signal generating means to said test echo signal generating means and said far-end talker signal memory.

4. The testable echo canceller claimed in claim 2 further including switching means for forming a path for directly connecting said far-end talker signal input terminal to output terminal in a testing mode of the echo canceller in a manner to enable the test for said echo canceller to be performed while a call/talk is alive.

5. The testable echo canceller claimed in claim 1, wherein said test far-end talker signal generating means, said test echo signal generating means, and said residual echo detecting means are capable of respectively executing their own functions under a stored program.

6. The testable echo canceller claimed in claim 1, wherein said test far-end talker signal generating means is a white noise generator operated under a program.

7. In a communication system including at least one trunk circuit, testable echo cancellers connected to said trunk circuit(s), a signal converting means for receiving or sending a signal from or to said testable echo cancellers and coverting said signal, and a signal sending or receiving interface circuit connected to said signal converting means, said communications system comprising a test indicating means being connected to said testable echo canceller(s), indicating start of a test for each echo canceller, and collecting a testing result, said testable echo canceller comprising a far-end talker signal memory for storing a far-end talker signal being input thereto, a tap coefficient memory storing a tap coefficient of an echo estimator, the echo estimating means for generating a pseudo echo signal from said far-end talker signal memory and said tap coefficient memory, a subtracter means for substracting the pseudo echo signal from an echo signal flown through an echo path for producing a residual echo signal, a tap coefficient updating means for sequentially correcting said tap coefficient based on said far-end talker signal and residual echo signal, a far-end talker signal generating means for generating a test far-end talker signal, an echo signal generating means for generating an echo signal with a simulated echo path, a residual echo detecting means for detecting a residual echo signal, end a control means for forming a test signal path in a manner to, in a test mode, supply a signal from said far-end talker signal generating means to said echo canceller, and supply an output of said subtracter means to said residual echo detecting means.

8. The communications system claimed in claim 7, wherein said test indicating means serves to supply the test mode signal to said control means included in said testable echo canceller for starting said control means.

9. The communications system claimed in claim 8, wherein said test indicating means serves to selectively or sequentially test said testable echo cancellers based on a program.

10. The communications system claimed in claim 7 further including a bypassing means for enabling said near-end talker signal to bypass said testable echo cancellers in response to the test-starting indication given to said control means.

11. The communications system claimed in claim 7 further including a testing method for the testable echo cancellers, said method comprising the steps of issuing a test-starting command from said test indicating means to said testable echo cancellers, connecting said far-end talker signal memory to said far-end talker signal generating means in response to said test-starting command, supplying a echo signal from said echo signal generating means to said subtracter means, and switching the signal path in a manner to connecting an output terminal of said subtracter means to said residual echo detecting means, and determining if the echo cancellers function normally or abnormally based on the output sent from said residual echo detecting means in said test indicating means.

12. The testing method for said testable echo cancellers claimed in claim 11 further comprising the step of, in a test mode, forming a path between said trunk circuit and said signal converting means, said path enabling the far-end talker signal to bypass said testable echo cancellers.

13. A testing method for communications equipment adaptive testable cancellers comprising the steps of;

pre-providing a far-end talker signal generator program means for generating a test far-end talker signal, an echo signal generator program means for simulating an echo path and generating an echo signal, and a residual echo detector program means for detecting a residual echo signal based on an output of each echo canceller together with the echo cancellers, switching far-end talker signal input and output terminals for said echo cancellers in a manner to form a test path where, in a test mode, said far-end talker signal generating program is connected to a far-end talker signal memory contained in said each echo canceller and said echo signal generator program means is connected to an input terminal of a subtracter means contained in said each echo canceller, and said residual echo detecting program is connected to said output terminal of said subtracter, and testing a function of said echo canceller in the formed test path.

* * * * *